UNITED STATES PATENT OFFICE.

ARTHUR C. SPENCER, OF WASHINGTON, DISTRICT OF COLUMBIA.

PROCESS OF RECOVERING POTASH.

1,157,437.  Specification of Letters Patent.  Patented Oct. 19, 1915.

No Drawing.   Application filed January 6, 1912.  Serial No. 669,748.

*To all whom it may concern:*

Be it known that I, ARTHUR C. SPENCER, a citizen of the United States, residing at Washington, in the District of Columbia, have invented certain new and useful Improvements in Processes of Recovering Potash, of which the following is a specification.

This invention relates to processes of recovering potash; and it comprises a method of recovering potash from alkali-bearing igneous rocks wherein such rock in a comminuted state is admixed with a limited quantity of lime, or equivalent calcareous material, such quantity being less than that required to form tricalcium compounds with the silica present and advantageously considerably less, the admixture is brought to a sintering or agglutinating temperature and the potash fumed off and recovered; all as more fully hereinafter set forth and as claimed.

Many igneous rocks contain compound silicates comprising potassium but the recovery of potash therefrom is somewhat difficult, these silicates being refractory and not yielding readily to reagents. This is particularly true of the feldspars, in which there is, so to speak, an excess of silica. Such rocks and minerals may however be treated to regain potash and form useful products by mixing with sufficient lime in the form of limestone to form cementitious products and then furnacing in ways analogous to the ordinary cement-making operation, as by passing the mixture as a thin traveling stream down through a rotary kiln against an opposed current of flame and flame gases (application Ser. No. 600,697). Under these conditions, the lime unites with the silica, the alumina and the ferric oxid to form cement clinker of a character analogous to Portland clinker while the potash goes off in fume form and may be recovered with the kiln dust.

In making clinker analogous to Portland cement clinker however since there must be enough lime present to correspond to tricalcium compounds, of necessity large amounts of limestone must be employed. Taking an orthoclase of the normal composition, it requires nearly three times its weight of limestone to produce a normal weight of limestone to produce a normal clinker. With Portland cement, made from limestone and clay, roughly speaking there must be at least twice as much limestone as clay. All this material must be heated to the sintering temperature before the potash can be fumed off and since in practice, an operation such as this must always be done by direct firing in some way, whether in a reverberatory or in a kiln, the greater the amount of materials which must be treated per unit of contained potash, the greater is the amount of fuel which must be used to bring the mixture to the desired heat and, consequently, the greater also is the amount of fire gases in and by which the potash fumed off is carried and diluted. And additional fuel, with concomitant products of combustion must also be used to supply the heat needed for the endothermic decomposition of calcium carbonate while the carbon dioxid driven off adds to the volume of effluent gases. There is some advantage however in performing the calcination by effluent potassiferous gases since this reduces the temperature of the gases and renders easier the collection of fumes and particularly in using some types of fume collecting devices, such as the electrostatic fume depositors.

As the fumed off potash must be recovered from the effluent gases, the high dilution of the fumes by the kiln gases in the described operation offers some practical difficulties in the separation of the fumes for the recovery of the potash.

I have discovered that even with the highly siliceous minerals like feldspar, the quantity of lime employed may be diminished with advantage so far as the recovery of potash is concerned. Instead of using enough lime to correspond with tricalcium aluminate and a considerable proportion of tricalcium silicate as in making Portland cement, less than that amount may be employed with advantage. The clinkered products no longer have cementitious properties, in the sense of being analogous to Portland cement, but may be utilized for other purposes, as by being converted into blocks, bricks, and other structural shapes by pressing or briqueting into form while the clinker is still hot and plastic. Being free of tricalcium silicate, the shapes are permanent and do not weather. The amount of lime may go so low as to be merely enough to constitute a moderate excess over the amount equivalent to the amount of potash present. In calculating the amount of lime to be added of course that contained in the original mineral may be allowed for. For the present purposes, since there is no effort to make anything like Portland cement, magnesia is equivalent, molecule for molecule, to lime and hereafter in using the words "calcium" and "lime" I desire them to be considered as equivalent to "magnesium" and "magnesia". For example, in preparing the batch or charge, dolomitic lime may be used in lieu of ordinary lime. Similarly, the magnesia and lime in the mineral itself may be considered as equivalent. I have found that ordinarily in the case of low silica rocks, there may be needed only 2 to 8 parts of total lime (or lime and magnesia) for every part of potash present in the rock. In case the batch comprises rock rather rich in soda it is found that less lime is required to free the potash than to accomplish the same result in treating materials containing only potash or minor amounts of soda. Clinkering in the presence of a large excess of lime liberates soda as well as potash; but with less lime the soda appears to be retained in silicate combination with the lime and the potash is liberated, the expulsion of potash being preferential under proper temperature control.

The total of the lime (or lime and magnesia) coming from added and contained lime (or lime and magnesia) in the clinker or sinter is advantageously in less proportion to the total of the silica and sesquioxids than the 1.7:1 ratio which characterizes Portland cement clinker; and is best below a ratio of 1.6 to 1. A ratio of about 1.5:1 is still better. Stated in another way, the clinker or sinter advantageously contains less than 60 per cent. of lime (or lime and magnesia) and still more advantageously for the present purposes, it will contain less than 58, or, better, less than 56 per cent. Using these small proportions of lime, the rock may be mixed in a finely divided state with the comminuted lime or limestone and the mixture brought to the sintering or fritting point, at which it is maintained for a sufficient time to allow a substantially complete expulsion of the potash as fumes. It is inadvisable to raise the temperature to the fusing point, since this lessens the surface exposed and thereby, concomitantly, lessens the evolution of potash in a time unit. On the other hand, the temperature should not fall below the softening point since otherwise the materials do not effectively react.

While, as stated, the present process is applicable to the highly siliceous rocks or minerals containing potash, such as orthoclase or potash feldspar, microcline, etc. I have found that it is particularly advantageous with the more neutral compound silicates of the leucite class and rocks containing them. Nephelite syenite and analcite basalt carrying high soda and potash are suitable materials as well as leucite and leucite rocks, such as leucite basalt. These feldspathoid silicates do not contain the large proportion of silica found in feldspar rocks or in the mineral feldspar and are much more reactive, so that they are converted more readily with the small amounts of lime which are to be used in the present invention. And of course with the lower silica content of feldspathoid rocks and minerals, as compared with feldspathic, less lime is required to form basic calcium compounds. There are many rocks which are composed of, or contain large amounts of, these feldspathoid minerals, such as many basalts and other igneous rocks. Leucite basalts from Sweetwater, Wyo., carry 42 to 54 per cent. of silica and 15 per cent. or so sesquioxids, 10 to 24 per cent magnesia and lime, and 8 to 12 per cent. potash. Rocks of a similar range in composition are found in many parts of the country and particularly in Wyoming and Montana. It is not difficult to obtain other low silica rocks with 6 to 10 per cent. $K_2O$. As a rule these rocks carry some proportion of potassiferous mica and feldspar, but they are characterized by and named after the feldspathoid minerals the presence of which points to their relatively low content of silica. I have found that these basalts and related igneous rocks on mixing with small proportions of lime and holding at a sintering temperature for some time, readily give large yields of potash. With the typical leucite basalts referred to above, I have found that as little as 20 to 50 pounds of added lime may be employed per 100 pounds of ore and will give a copious evolution of potash. As stated, this material may contain more than 20 per cent. of total magnesia and lime. Other materials may require even less. In practice a rock carrying 42 per cent. $SiO_2$ and 15 per cent. $R_2O_3$, (alumina and ferric oxid) and containing the equivalent in CaO and MgO of 25 per cent. CaO may require the addition of from 10 pounds to 70 pounds of lime, for each 100 pounds of rock, the latter amount being not enough to permit the formation of tricalcium silicate under clinkering conditions. In case of a rock carrying 52 per cent. $SiO_2$ and 12 per cent. $R_2O_3$ with, say, 15 per cent. of lime or its equivalent, the minimum aggregate of added lime required would be about 20 pounds, the maximum permissible 100 pounds per 100 pounds of rock, and an advantageous addition of lime would be from 80 to 90 pounds.

The sintering operation may be performed in any apparatus adapted for direct heating of the batch or charge of reaction materials by flame gases. In order to carry off the fume it is necessary to have a moving body or current of gases of some kind, and this is conveniently and economically afforded by direct firing. A rotary kiln of an ordinary type may be employed or the heating may be performed in a stationary reverberatory if desired. It is less advantageous to use "stationary" kilns with briqueted material since less free surface is afforded for the evolution and carrying away of fume from the material. Some gas movement over the material is necessary and for this reason electric heating is not advantageous unless special provisions be made for circulation of gas over the sintering material, as by cyclic circulation of gas over the material through a fume condensing chamber and then back. But, as stated, with the comparatively small proportions of lime and material used in the present invention, the volume of gases from the fuel used in firing is not excessive as it is where a high proportion of lime must be used as in the manufacture of ordinary Portland cement. Some gas current is necessary to carry the fume but it is not here necessary to use too much or an amount inconvenient for potash recovery, as in cement making operations. The amount of fire gases passing over the material to carry away fumed off potash may be still further reduced by bringing the material nearly to temperature in a separate furnace and then performing the sintering and potash recovery in a special furnace, as by using a pair of individually heated rotary kilns, the one feeding into the other. This expedient is particularly desirable where limestone in lieu of lime is employed for furnishing the calcareous component. With limestone, the mixture may be calcined in a special kiln and then delivered to another kiln for the sintering and fuming off of the potash. In this secondary kiln, the volume and movement of the gas current can of course be regulated to a nicety. It is however usually advantageous to use preleminarily calcined lime in admixture with the powdered mineral matter instead of calcium carbonate. A very intimate mixture of the lime and the rock can be secured by using milk of lime in the batch to form a slurry. This insures lime being in contact with every portion of the rock and much lessens the time required for the fuming off operation. However, dry mixtures of lime and rock, though requiring somewhat longer time in the sintering, work very satisfactorily.

In lieu of lime or limestone, other calcareous materials may be employed. The object is to displace the potash by lime at a heat where the potash will fume off. By using calcium chlorid in lieu of or in conjunction with lime, the potash is converted into the comparatively volatile form of potassium chlorid and the fuming off requires less time and may be done at a somewhat lower temperature. The amount of calcium chlorid should not be large enough to be more than equivalent to the amount of CaO stated. A mixture of salt and lime may be similarly employed since, as stated, with leucite and minerals of like character, there is greater tendency for soda than potash to be retained under the conditions of the present operation. Where phosphate of lime is available, it may be used, or gypsum may be employed. If sulfur is present in the fuel sulfate of potash is formed in the fume. Sulfur burns to sulfur dioxid and trioxid which combine with the potash of the fume, forming sulfate.

The rock used may be disintegrated to any extent desired but advantageously it is in very fine powder. The finer, the less the time required in the fuming off operation. It is advantageous to use sufficient lime, (or equivalent calcareous material as explained) to about balance the silica, alumina, and iron sesquioxid of the material in bimolecular proportions, or at least an amount in excess of double the chemical equivalent of the silica present, using ordinarily a slight excess above this amount but not reaching the tricalcium silicate ratio. There may be advantageously enough lime to form a bicalcium silicate with the silicate of the rock, and enough to form tricalcium compounds with the alumina and iron sesquioxid present, but not enough to form any substantial amount of tricalcium silicate, with the silica present. After making an intimate mixture of the lime (and lime is much preferable to limestone for the present purposes) with the rock, the mixture is to be sintered and maintained at a high temperature for a sufficient length of time to allow as complete an evolution of the potash as possible. The evolution of potash in a time unit is substantially proportional to the surface exposed and it is therefore advantageous, as stated, to keep the mixture below the actual fusing point and at the sintering point. A full red heat is a desirable temperature if continued for a sufficiently long time. A higher temperature has however been found advantageous, quickening the evolution of the fumes, provided the temperature does not reach the melting point. Much depends on the particular rock.

While, as stated, any convenient type of combustion heated furnace may be employed for the present purposes, it is in practice advantageous to work in an ordinary rotary inclined cement kiln having firing means at its mouth and provided with dust catching means at the other end. The firing means may be an aerially suspended flame plume of powdered coal or oil burning in the air. With a rotary kiln, it is desirable to cut down the amount of air considerably below that ordinarily used, to prevent dilution of the fumes.

The sintered but unfused material delivered from the kiln, or other furnace, while still retaining its heat may be stamped or compressed into blocks or other desired shapes, the particles of hot treated mineral uniting by a welded union at their meeting surfaces to produce an open textured strong aggregate useful for structural purposes.

Ordinarily there is rather less lime than mineral used in employing the stated proportions. This means that, in bringing to and maintaining at the sintering temperature, much less fuel is required than would be necessary in making cement from the same rock; and the dilution of the fume is correspondingly diminished. The operation thus gives a comparatively concentrated fume which can be readily treated in any of the ordinary types of fume recovering apparatus. The dust and fumiform products of the furnace or kiln may be taken up in suspension by the gases which pass therethrough. These products may be collected by means of a flue and passed through settling chambers or dust catchers which may be of any convenient type. With certain types of dust traps, it is advantageous to provide water cooled surfaces within the chambers to promote the desired settling of the potassiferous fume. Of course gas washers of different types may be employed to effect the separation of the potash product from the gases which carry it out of the kiln.

I do not describe in detail apparatus for carrying out my process as it is sufficiently obvious that furnaces or kilns like those now used in other arts are adapted for the treatment here described. If certain types of kilns are used it will be necessary to form the materials of the batch into briquets prior to the heat treatment, but this procedure which, for reasons stated, is little advantageous, cannot constitute a departure from my invention which resides in the advantageous proportioning of the charge-batch, permitting evolution of alkali at a relatively low temperature, reducing the required consumption of fuel, and promoting the ready collection of the alkali products.

What I claim is:—

1. In the treatment of igneous rocks and minerals carrying potash and silica, the process of recovering potash which comprises heating and maintaining the same at a sintering temperature in the presence of lime in amount at least sufficient to replace said potash and to form dicalcium silicate, but not enough to form tricalcium silicate after providing for tricalcium aluminate and tricalcium ferrite, such temperature being maintained until substantially all the potash is removed and recovering the potash fumed off in the sintering.

2. The process of recovering potash from igneous rocks characterized by feldspathoid minerals which comprises heating and maintaining the same in a comminuted form and admixed with calcareous material at a sintering temperature, the amount of such calcareous material being at least sufficient to replace the potash present and to form dicalcium silicate but insufficient to form tricalcium silicate with the silica present after providing for tricalcium aluminate and tricalcium ferrite, and such temperature being maintained until substantially all the potash is removed and recovering the potash fumed off in the sintering.

3. The process of recovering potash from rocks composed of or containing feldspathoid minerals which comprises heating and maintaining such rocks in a comminuted form and admixed with calcareous material at a sintering temperature, the amount of such calcareous material being about that required to form dicalcium compounds with acidic bodies present and such temperature being maintained until substantially all the potash is removed, and recovering the potash fumed off in the sintering.

4. The process of recovering potash from igneous rocks carrying potash in silicate combination which comprises clinkering a comminuted mixture of the rock with calcareous material till substantially all the potash is fumed off, said mixture being proportioned to yield clinker containing at least 1.87 times as much lime as silica but less than 1.7 times as much lime as silica plus alumina plus iron oxid.

5. The process of recovering potash which comprises sintering a comminuted mixture of lime and rock comprising feldspathoid minerals so proportioned that there is sufficient lime equivalent to make $Al_2O_3 3CaO$ and $Fe_2O_3 3CaO$ with the alumina and iron oxids present but not sufficient to yield any substantial amount of $SiO_2 3CaO$.

6. The process of recovering potash which comprises sintering a comminuted mixture of lime and rock comprising feldspathoid minerals so proportioned that the resulting clinker may show on analysis less than 1.7 times as much lime as the total of $SiO_2$ and $R_2O_3$ but at least 1.87 times as much lime as silica.

7. The process of recovering potash which comprises sintering a comminuted mixture of lime and rock comprising feldspathoid minerals so proportioned that the resulting clinker may show on analysis less than 1.6 times as much lime as the total of $SiO_2$ and $R_2O_3$ but at least 1.87 times as much lime as silica.

8. The process of recovering potash which comprises sintering a comminuted mixture of lime and rock comprising feldspathoid minerals so proportioned that the resulting clinker may show on analysis less than 1.5 times as much lime as the total of $SiO_2$ and $R_2O_3$ but at least 1.87 times as much lime as silica.

9. The process of recovering potash which comprises sintering a comminuted mixture of lime and rock comprising feldspathoid minerals so proportioned that the resulting clinker may show on analysis less than 60 per cent. of lime.

10. The process of recovering potash which comprises sintering a comminuted mixture of lime and rock comprising feldspathoid minerals so proportioned that the resulting clinker may show on analysis less than 58 per cent. of lime.

11. The process of recovering potash which comprises sintering a comminuted mixture of lime and rock comprising feldspathoid minerals so proportioned that the resulting clinker may show on analysis less than 56 per cent. of lime.

12. The process of recovering potash which comprises sintering a comminuted mixture of lime and rock comprising feldspathoid minerals so proportioned that the resulting clinker may show on analysis less than 54 per cent. of lime.

In testimony whereof, I affix my signature in the presence of two subscribing witnesses.

ARTHUR C. SPENCER.

Witnesses:
 JOHN H. SIGGERS,
 K. P. MCELROY.

Copies of this patent may be obtained for five cents each, by addressing the "Commissioner of Patents, Washington, D. C."